United States Patent
Duyvesteyn et al.

(10) Patent No.: US 6,375,923 B1
(45) Date of Patent: Apr. 23, 2002

(54) PROCESSING TITANIFEROUS ORE TO TITANIUM DIOXIDE PIGMENT

(75) Inventors: Willem P. C. Duyvesteyn; Bruce James Sabacky; Dirk Edmund Victor Verhulst, all of Reno, NV (US); Paul George West-Sells, Vancouver (CA); Timothy Malcome Spitler, Fernley, NV (US); Andrew Vince, Moranbah (AU); James R. Burkholder; Bernardus Josephus Paulus Maria Huls, both of Reno, NV (US)

(73) Assignee: Altair Nanomaterials Inc., Reno, NV (US)

( * ) Notice: Subject to any disclaimer, the term of this patent is extended or adjusted under 35 U.S.C. 154(b) by 0 days.

(21) Appl. No.: 09/500,207

(22) Filed: Feb. 7, 2000

Related U.S. Application Data

(60) Provisional application No. 60/141,114, filed on Jun. 24, 1999, provisional application No. 60/141,057, filed on Jun. 24, 1999, and provisional application No. 60/147,702, filed on Aug. 6, 1999.

(51) Int. Cl.[7] ............... C01G 23/047; C01G 23/00; B01D 11/00; B01D 11/02

(52) U.S. Cl. ............... 423/610; 423/658.5; 423/70; 423/80; 423/85; 423/86

(58) Field of Search ............... 423/610, 658.5, 423/70, 80, 86, 85

(56) References Cited

U.S. PATENT DOCUMENTS 3,622,269 A * 11/1971 Yamamura et al. ......... 23/87 R
3,660,029 A * 5/1972 Naguib ............... 23/202 R
3,903,239 A 9/1975 Berkovich (List continued on next page.)

FOREIGN PATENT DOCUMENTS

DE 197 25 616 C 11/1998
EP 0 016 583 A 10/1980

(List continued on next page.)

OTHER PUBLICATIONS

Patent Abstracts of Japan, vol. 007, No. 086 (C–161), Apr. 9, 1983 & JP 58 015031 A (Taijirou Okabe), Jan. 28, 1983 abstract.

*Primary Examiner*—Steven P. Griffin
*Assistant Examiner*—Cam N. Nguyen
(74) *Attorney, Agent, or Firm*—Brinks Hofer Gilson & Lione; G. Peter Nichols

(57) ABSTRACT

A hydrometallurgical process is provided for producing pigment grade $TiO_2$ from titaniferous mineral ores, and in particular from ilmenite ore. The ore is leached with a hydrochloric acid, preferably a recycled solution at high hydrochloric acid concentration, to form a leachate containing titanium and iron chloride and a residue. The leachate may be filtered to separate the leachate from the residue. The leachate is cooled to a temperature sufficient to form crystals of $FeCl_2$, which are separated from the leachate. The leachate may be subjected to a reduction step to reduce $Fe^{+3}$ to $Fe^{+2}$, before crystallizing. The leachate is subjected to a first solvent extraction to form a pregnant strip solution containing titanium and ferric ions and a raffinate containing ferrous ions. This strip solution is subjected to a second solvent extraction to form a second strip solution containing ferric ions and a raffinate containing titanium ions. The first strip solution may be subjected to an oxidization step before the second solvent extraction. The second raffinate containing titanium ions is hydrolyzed. The hydrolysis can be by water addition or spray hydrolysis. Iron chloride is converted to iron oxide and hydrochloric acid. All product streams containing chlorides are recycled, producing gaseous hydrochloric acid that is used for regenerating the leaching solution.

31 Claims, 8 Drawing Sheets

U.S. PATENT DOCUMENTS

| | | | |
|---|---|---|---|
| 3,935,094 A | | 1/1976 | Bergeron et al. |
| 3,941,583 A | | 3/1976 | Martin et al. |
| 3,961,005 A | | 6/1976 | Sparks |
| 3,961,940 A | | 6/1976 | Fukushima et al. |
| 3,966,455 A | | 6/1976 | Taylor |
| 3,967,954 A | | 7/1976 | Chen |
| 3,996,332 A | | 12/1976 | Elger et al. |
| 4,012,338 A | * | 3/1977 | Urwin ........................ 252/461 |
| 4,082,832 A | | 4/1978 | Watanabe et al. |
| 4,085,190 A | | 4/1978 | Shiah |
| 4,089,675 A | | 5/1978 | Preston et al. |
| 4,097,574 A | | 6/1978 | Auger et al. |
| 4,107,264 A | | 8/1978 | Nagasubramanian et al. |
| 4,120,694 A | | 10/1978 | Elger et al. |
| 4,152,252 A | | 5/1979 | Tolley et al. |
| 4,158,041 A | | 6/1979 | Tolley |
| 4,168,297 A | | 9/1979 | Nagasubramanian et al. |
| 4,172,878 A | | 10/1979 | Tolley |
| 4,174,274 A | | 11/1979 | Tolley et al. |
| 4,174,963 A | | 11/1979 | Tolley |
| 4,175,110 A | | 11/1979 | Tolley |
| 4,175,952 A | | 11/1979 | Tolley |
| 4,178,176 A | | 12/1979 | Tolley |
| 4,183,768 A | | 1/1980 | Knapp et al. |
| 4,199,552 A | | 4/1980 | Rado |
| 4,206,021 A | | 6/1980 | Rivory |
| 4,230,542 A | | 10/1980 | Traini et al. |
| 4,269,619 A | | 5/1981 | Keil et al. |
| 4,269,809 A | | 5/1981 | Tolley et al. |
| 4,288,417 A | | 9/1981 | Rahm et al. |
| 4,288,418 A | | 9/1981 | Davis et al. |
| 4,304,758 A | | 12/1981 | Rieck et al. |
| 4,313,913 A | | 2/1982 | Panek et al. |
| 4,321,236 A | * | 3/1982 | Stambaugh et al. .......... 423/82 |
| 4,359,449 A | | 11/1982 | Hard et al. |
| 4,384,883 A | | 5/1983 | Fensom |
| 4,389,391 A | | 6/1983 | Dunn, Jr. |
| 4,390,365 A | | 6/1983 | Hard et al. |
| 4,401,467 A | | 8/1983 | Jordan |
| 4,468,248 A | | 8/1984 | Megy |
| 4,762,552 A | * | 8/1988 | Baldwin et al. ............... 75/1 T |
| 4,986,742 A | | 1/1991 | Denecker et al. |
| 4,997,533 A | * | 3/1991 | Kawatra et al. ............ 204/113 |
| 5,061,460 A | | 10/1991 | Watanabe et al. |
| 5,068,093 A | | 11/1991 | Mauer |
| 5,104,445 A | | 4/1992 | Dubrovsky et al. |
| 5,106,489 A | | 4/1992 | Schmidt et al. |
| 5,135,652 A | | 8/1992 | Boateng |
| 5,192,443 A | | 3/1993 | Delloye et al. |
| 5,224,986 A | | 7/1993 | Mostert et al. |
| 5,225,178 A | | 7/1993 | O'Donnell et al. |
| 5,378,438 A | | 1/1995 | Leary |
| 5,397,375 A | | 3/1995 | O'Donnell et al. |
| 5,399,751 A | | 3/1995 | Gentry et al. |
| 5,427,749 A | | 6/1995 | Hollitt et al. |
| 5,441,712 A | | 8/1995 | Duyvesteyn et al. |
| 5,482,691 A | | 1/1996 | O'Donnell et al. |
| 5,490,976 A | | 2/1996 | Rennie et al. |
| 5,595,347 A | | 1/1997 | Walpole |
| 5,601,630 A | | 2/1997 | Hoecker |
| 5,679,131 A | | 10/1997 | Obushenko |
| 5,698,205 A | | 12/1997 | Brückner et al. |
| 5,730,774 A | | 3/1998 | Hollitt et al. |
| 5,730,795 A | | 3/1998 | Herkimer |
| 5,826,162 A | | 10/1998 | Aral et al. |
| 5,833,892 A | | 11/1998 | Gurav et al. |
| 5,885,324 A | * | 3/1999 | Balderson et al. ............. 75/435 |
| 6,037,289 A | | 3/2000 | Chopin |

FOREIGN PATENT DOCUMENTS

| | | |
|---|---|---|
| EP | 0 186 370 A2 | 2/1986 |
| EP | 0 356 132 | 2/1990 |
| GB | 2 166 126 A | 4/1986 |
| WO | WO 95/08004 | 3/1995 |
| WO | WO 96/24555 | 8/1996 |
| WO | WO 97/10185 A | 3/1997 |
| WO | WO 97/30130 A | 8/1997 |

* cited by examiner

PROCESSING TITANIFEROUS ORE TO TITANIUM DIOXIDE PIGMENT

CROSS REFERENCE TO RELATED APPLICATIONS

This application claims priority to U.S. Provisional Application Serial No. 60/141,114 filed Jun. 24, 1999, to U.S. Provisional Application Serial No. 60/141,057 filed Jun. 24, 1999, and to U.S. Provisional Application Serial No. 60/147,702 filed Aug. 6, 1999, the entire contents of which are incorporated herein by reference.

BACKGROUND OF THE INVENTION

The present invention relates to a process for producing titanium dioxide of a pigment grade, parts of the process, and the product of the process. In particular, the present invention relates to the processing of titaniferous ore, especially ilmenite ore to $TiO_2$ pigment. The process includes a novel combination of operational steps to economically produce a high quality grade titanium dioxide pigment.

Titanium dioxide is considered the principal white pigment of commerce. It has exceptionally high refractive index, negligible color and is quite inert. Titanium dioxide may be present in either of two predominant forms, anatase or rutile. For the majority of commercial applications, rutile is the desired form.

There are two main forms of titanium ore available. One is mineral rutile, which is composed of greater than about 90% to 95% titanium dioxide. The other is ilmenite (generally having the formula $FeOTiO_2$ or $FeTiO_3$), which contains from about 45% to about 65% titanium dioxide. It is known to upgrade the ilmenite to titania slag, which contains about 85% titanium dioxide and about 10% iron oxide.

There are two main processes for making raw pigmentary titanium dioxide, the sulfate process and the chloride process. The sulfate process relies on ilmenite or titania slag as the raw material. Generally, the ilmenite is digested in concentrated sulfuric acid, iron sulfate is separated after cooling, and titanium hydrolysate e.g. hydrated $TiOSO_4$ is precipitated by addition of water following special procedures. The precipitate is calcined to form $TiO_2$ with the desired properties. The advantage to this process is that ilmenite may be used as the starting ore, which is relatively plentiful, particularly when compared to the diminishing reserves of rutile. The disadvantages of this process include a necessarily high input of energy, expensive and complicated equipment, long processing times, and undesirably large volumes of acidic liquid wastes, containing iron sulfate.

The chloride process relies on chlorination of a low iron titanium ore followed by the gas-phase oxidation of $TiCl_4$. One disadvantage to this process is that the starting material, rutile, is becoming scarce. In addition, direct chlorination of ilmenite is generally not economical because the ilmenite contains a substantial amount of iron, which converts a substantial amount of the chlorine to iron chloride, making it unavailable to chlorinate the titanium.

Processes exist to remove iron from ilmenite and similar ores, and to produce synthetic rutile, which can be used in the chloride process. For example, the Becher process (U.S. Pat. No. 3,502,460), the Benilite process (U.S. Pat. No. 3,967,954) and the Murso process are known. These processes consist of pretreatment steps followed by partial leaching in hydrochloric acid. The procedure involves several stages and is expensive, particularly since the synthetic rutile product is impure and must be further treated by the chlorination process.

U.S. Pat. No. 3,903,239 teaches a process where the titanium as well as the iron contained in ilmenite ore is dissolved in concentrated hydrochloric acid and the iron is subsequently reduced and precipitated as ferrous chloride. The titanium is precipitated by adding water to the solution after separation of iron chloride. To limit the amount of water to be added and to keep the total amount of solution to be regenerated small, the amount of acid used in the leaching process is kept as low as possible. Also, to avoid hydrolysis of $TiO_2$ during leaching with this limited excess of acid, the temperature is kept low and the leaching time is on the order of several days. The process of the present invention also involves dissolution of both titanium and iron, and precipitation of iron chloride, but the following description will show the different purpose of the leaching and regeneration steps and the greater advantages resulting from the process of the present invention.

Two significant advantages of the present process over that taught in U.S. Pat. No. 3,903,239, include the use of HCl gas to supplement the acid consumed during the leaching process and the use of solvent extraction to purify the titanium solution. The use of HCl gas enhances leaching rates, increases the amount of ilmenite dissolved and enhances the product quality. The use of solvent extraction produces a hydrolyzed $TiO_2$ product with a much lower impurity level.

While U.S. Pat. No. 3,903,239 teaches the production of a titanium dioxide product with an iron contamination ranging between 100 and 200 ppm Fe, the present invention produces a SX raffinate containing 100 gpl Ti with only 1 ppm Fe. This results in a final titanium dioxide pigment product that contains only around 6 ppm Fe.

The market for common titanium dioxide pigment products generally requires a maximum iron specification of no more than 30–50 ppm Fe. Therefore, the process according to that disclosed in U.S. Pat. No. 3,903,239 requires an extra processing step to meet existing product quality specifications. In contrast, the process according to the present invention does not require such an extra processing step to meet market specifications.

SUMMARY OF THE INVENTION

The present invention relates to an economical hydrometallurgical process for producing pigment grade $TiO_2$ from titaniferous mineral ores and in particular from ilmenite ore. The ore is leached with hydrochloric acid solution in optimal conditions of temperature, pressure and concentrations to form a leachate containing titanium and iron chloride and a residue. Preferably, at least a portion and, more preferably, at least a majority of the hydrochloric acid solution is derived from recycling that is part of the process. For example, all the chloride streams may be recycled to produce gaseous hydrochloric acid via pyrohydrolysis of the iron chloride crystals and distillation of hydrochloric acid solutions. The recycled hydrochloric acid solution may be aqueous or may contain a gaseous portion.

The leachate may be filtered to separate the leachate from the residue. The leachate is cooled to a temperature sufficient to form crystals of $FeCl_2$, which are separated from the leachate. The leachate may be subjected to a reduction step to reduce ferric iron ($Fe^{+3}$) to ferrous iron ($Fe^{+2}$), before crystallizing. The leachate is subjected to a first solvent extraction to form a pregnant strip solution containing titanium and ferric ions and a raffinate containing ferrous iron and other impurity ions. This pregnant strip solution is subjected to a second solvent extraction to form a second strip solution containing ferric ions and a raffinate containing titanium ions. The first strip solution may be subjected to an oxidization step before the second solvent extraction. The second raffinate contains a very pure titanium chloride solution that may be hydrolyzed into pigment grade $TiO_2$.

Hydrolysis may be accomplished by heating and dilution of the solution. Because of the low impurity content, it is also possible to hydrolyze the solution by complete evaporation, while adding dopants that will precipitate in the bulk of the $TiO_2$ particles and allow precise control of the characteristics of the resulting $TiO_2$ product. This controlled total evaporation reaction may be conducted in a spray dryer. The process in which liquid solution containing titanium is sprayed into a reactor, the solution is evaporated until the titanium hydrolyzes, and the resulting hydrolyzed titanium is dried until it is substantially or completely dry will be called spray hydrolysis.

Thereafter, the recovered $TiO_2$ may be finish processed.

The advantages of the process to produce pigment grade titanium dioxide according to the present invention include:
- the use of ilmenite or other inexpensive titanium oxide ore as a raw material
- the use of gaseous HCL to enhance leaching rates and completion
- a succession of processing steps insuring fast leaching kinetics and good
- recovery of Ti from the ore and the production of a very pure Ti chloride solution allowing hydrolysis by complete evaporation
- a high quality titanium dioxide pigment product, with the potential to add well dispersed dopants and to vary the characteristics of the product over a wide range by simple changes to the operating conditions, the type, and the quantity of dopants
- recovery of the iron as an oxide of possible commercial value
- substantially complete regeneration of all chlorides to gaseous hydrogen chloride to be completely re-used and recycled in the leaching step.

DETAILED DESCRIPTION OF THE INVENTION

The present invention is a hydrometallurgical process for producing pigment grade $TiO_2$ from titaniferous mineral ores, and in particular from ilmenite ore.

Figure 1:
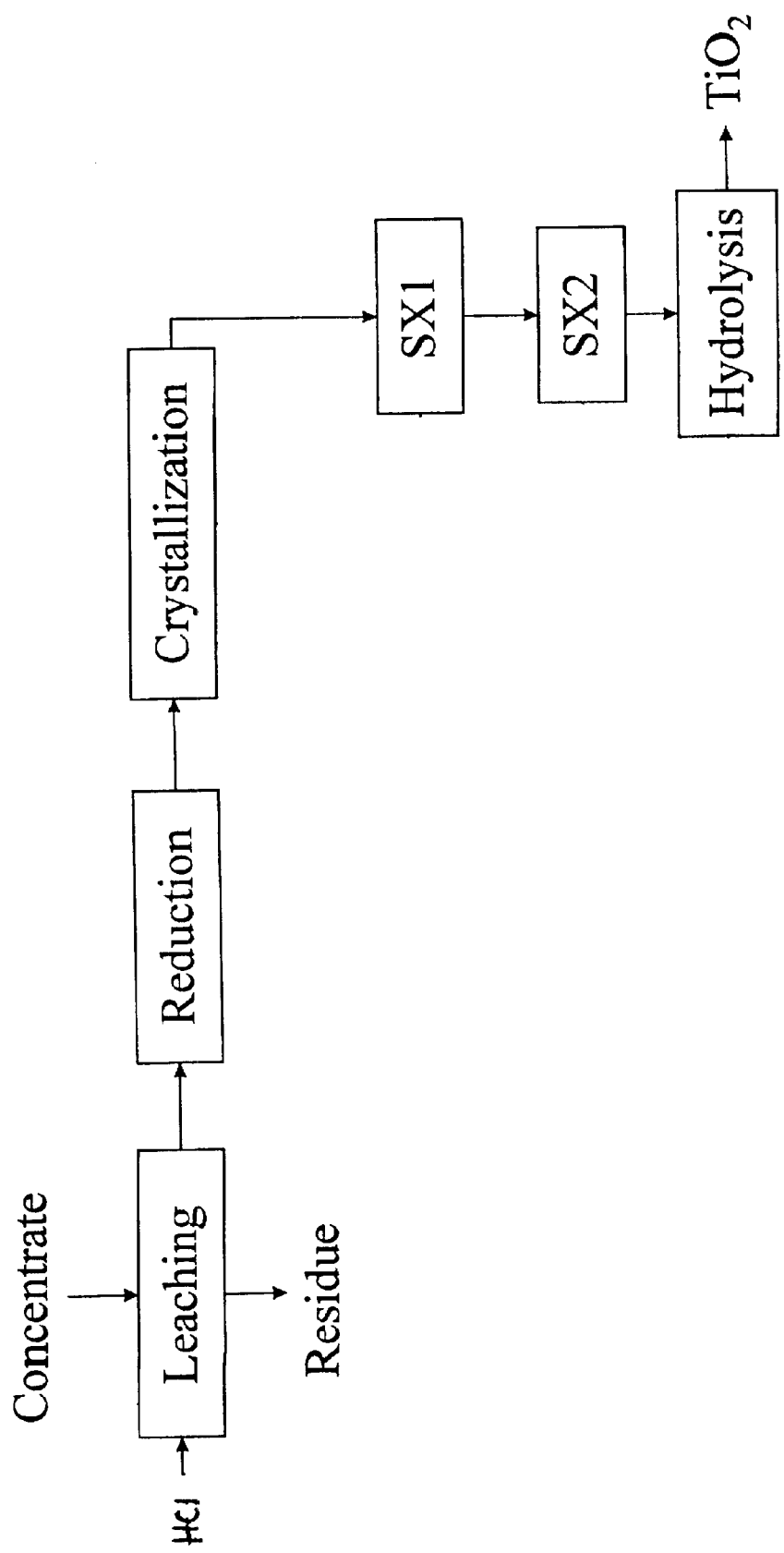
FIG. 1 is a flow sheet of one embodiment of the process according to the present invention.

Referring to FIG. 1, the general process according to the present invention is shown. In this process, the titaniferous ore is leached with an acid solution, preferably hydrochloric acid, to form a leachate containing titanium and iron chloride and a residue.

Figure 2:
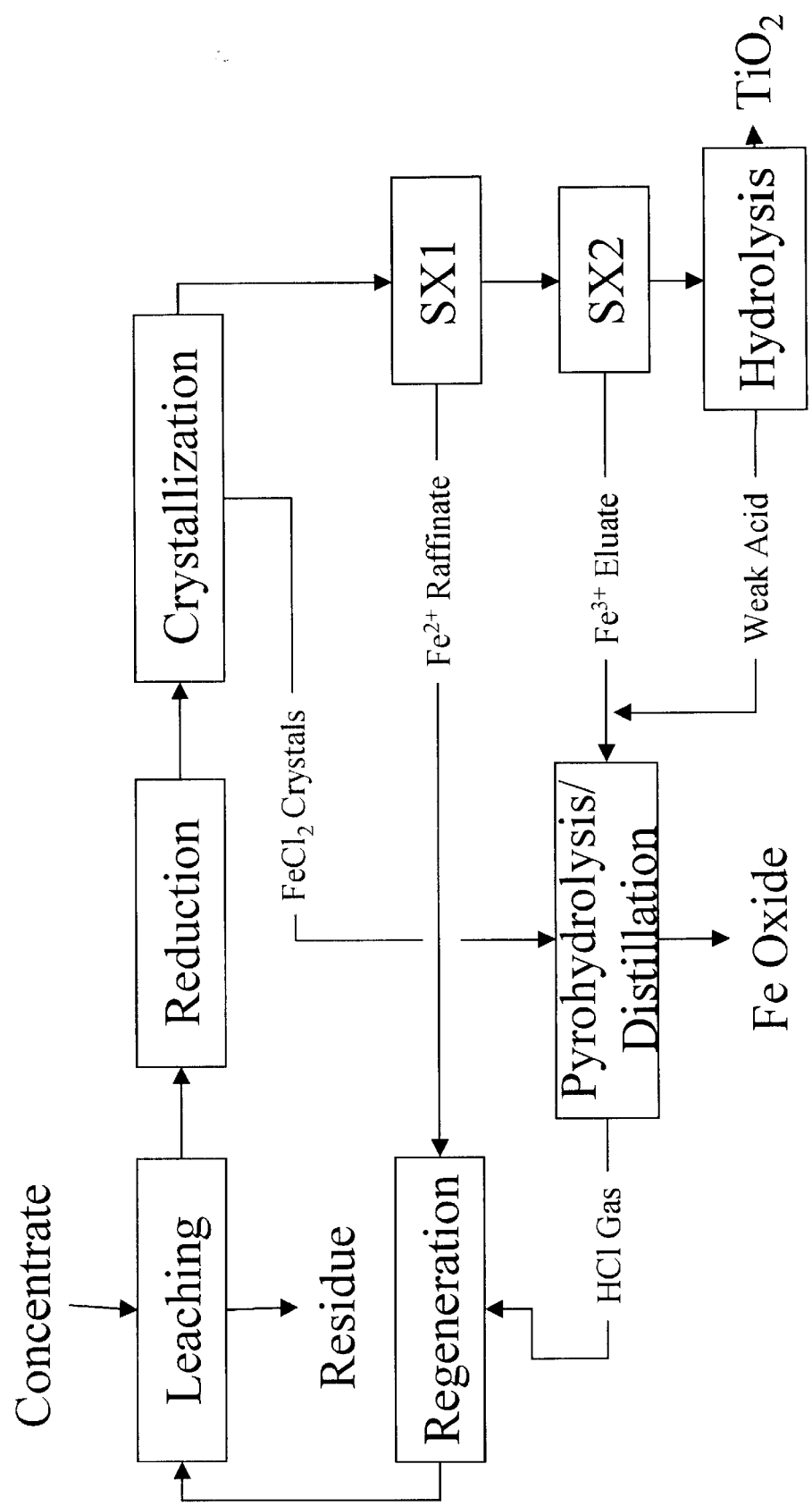
FIG. 2 is a flow sheet of a preferred embodiment of the process according to the present invention.

Preferably, as shown in FIG. 2, at least a portion and, more preferably, at least a majority of the hydrochloric acid solution is derived from recycling that is part of the process. For example, all the chloride streams may be recycled to produce gaseous hydrochloric acid via pyrohydrolysis of the iron chloride crystals and distillation of hydrochloric acid solutions. Thus, the acid solution may be regenerated concentrated hydrochloric acid/iron chloride solution. Alternatively, the ore may be leached with a hydrochloric acid/iron chloride solution enriched by injection of gaseous HCl.

The leachate may be filtered to separate the leachate from the residue. The leachate is cooled to a temperature sufficient to form crystals of $FeCl_2$, which are separated from the leachate. The leachate may be subjected to a reduction step to reduce ferric iron ($Fe^{+3}$) to ferrous iron ($Fe^{+2}$), before crystallizing. The leachate is subjected to a first solvent extraction to form a pregnant strip solution containing titanium and ferric ions and a raffinate containing ferrous ions. This pregnant strip solution is subjected to a second solvent extraction to form a second strip solution containing ferric ions and a raffinate containing titanium ions. The raffinate containing titanium ions is hydrolyzed. The hydrolysis can be carried out by heating and addition of water, or by total evaporation under controlled conditions and with the optional injection of additives or dopants, e.g. in a spray dryer. Thereafter, the recovered $TiO_2$ may be finish processed.

The process according to the present invention will be described in further detail in connection with FIG. 3, which includes final finishing of the product. It is to be understood that, although the following description is in reference to the process shown in FIG. 3, it also applies to the processes shown in FIG. 1 and 2.

Leaching

The titaniferous ore is leached with an acid solution, preferably hydrochloric acid. More preferably, at least a portion and, more preferably, at least a majority of the hydrochloric acid solution is derived from recycling that is part of the present process. In this instance, the acid solution is a regenerated concentrated hydrochloric acid/iron chloride solution. As noted above, all or a portion of the solution may by regenerated by injection of gaseous HCl.

The leaching produces a leachate or solution of soluble ferrous chloride, ferric chloride, and titanium chloride and solid gangue or residue. The titaniferous ore may be processed in any known and suitable manner before the leaching operation. In general, the titaniferous ore may be provided as ilmenite. For ease of description, the following process will be described using ilmenite as the starting titaniferous ore or concentrate source. It is to be understood that this reference does not limit the raw material source to ilmenite.

As noted above, recycling preferably provides the leach solution. For example, the leaching solution may by recycled raffinate from the first solvent extraction operation (described in more detail below) into which recovered hydrogen chloride gas has been injected. In general, to increase both the kinetics of the leaching reaction and the yield of Ti to solution, it is advantageous to provide a high hydrochloric acid concentration. A higher temperature is also advantageous, as long as hydrolysis of $TiO_2$ during or after the reaction can be avoided. To insure a high concentration of acid at all times, the amount of solids must be limited in such a way that the solution never gets depleted in acid. Alternatively, as the solution is being depleted from HCL that is converted into a metal chloride, further fresh or recycled HCL gas can be added to the leaching reactor.

With a free acid concentration of 450 g/l HCl and a temperature of 85° C., a pressure of no more than 100 psi of HCl and water vapor will build up in the reactor. Under these conditions, leaching an amount of solids of 150 g/l ilmenite, will consume about 120 g/l HCl, and the final solution will have 330 g/l free HCl, enough to prevent any precipitation of $TiO_2$. Lower temperatures and lower acid concentrations will quickly decrease the reaction rate as well as the final yield obtained. Higher temperatures will increase the rate of hydrolysis of $TiO_2$. They will also increase the vapor pressure in the system and require more expensive high-pressure equipment. An increase in the iron content of the solution used for leaching will have a slight beneficial effect on the rate of leaching. On the other hand, if the iron concentration is too high, iron chloride will precipitate during leaching, slowing down the leaching reaction and bringing iron chloride into the leach residue.

The preferred conditions therefore include an acid concentration greater than 250 g/l HCl during the leaching operation and a temperature of at least 50° C. More preferably, an acid concentration of at least 360 g/l HCl and a temperature of at least 70° C. with a temperature lower than 120° C., preferably, less than 110° C. The amount of solids present is chosen is such a way that the acid concentration remains greater than 250 g/l HCl after completion of the reaction.

The ilmenite may have any suitable particle size to provide for acceptable dissolution kinetics. In this regard, grinding the ilmenite will improve the dissolution kinetics by increasing the surface area available to the hydrochloric acid. With ilmenite ore having a particle size of less than 300 μm, the above conditions result in dissolution of about 90% or greater of the initial titanium and iron values in the feed material, after a reaction time of about 1–7 h.

The leaching can be carried in any suitable leaching reactor. For example, the reactor may be a stirred tank made of glass-lined steel, working in batch, or several reactors working in a co-current or countercurrent fashion.

Separation

The mixture is subjected to a separation step in which the residue is separated from the leachate that contains the soluble iron and titanium chlorides. The residue may contain some unreacted ilmenite and those components of ilmenite not soluble in the acid, principally quartz and silicate minerals. The separation may be effected in any suitable manner by means well known in the art, including but not limited to decantation, filtration, centrifugation, etc.

The leach residue should not be considered a true residue or waste product as it generally has a $TiO_2$ composition equal to or better than the original feed material. An average composition of such a residue, as well as the analysis of a typical Beenup ilmenite feed material (originating from the Beenup deposit in Western Australia), is presented in Table 1.

TABLE 1

| | Beenup ilmenite concentrate (wt. %) | typical leach residue (wt. %) |
|---|---|---|
| Ti | 31.3% | 37.5% |
| Fe | 32.8% | 23.4% |
| $TiO_2$ | 52.2% | 62.5% |
| Iron oxide | 43.9% | 31.3% |
| Other metal oxides | 1.5% | 1.4% |
| Insoluble residue | 2.4% | 4.8% |
| Total | 100% | 100% |

This residue may be recycled for further titanium extraction or can be marketed as an upgraded and higher value ilmenite concentrate. Alternatively, the residue may be disposed as a non-hazardous material in a landfill.

Reduction

Since the ilmenite minerals generally contain both ferrous and ferric iron in their chemical matrix, leaching will produce a solution with both $Fe^{2+}$ and $Fe^{3+}$ ions. Because iron is readily removed from the leach solution as a ferrous chloride crystal ($FeCl_2.4H_2O$), it is desirable to reduce a substantial portion of the ferric ion in the leach solution to the ferrous state, thereby allowing its removal as ferrous chloride. The reducing agent may be any agent that will reduce a substantial portion of the $Fe^{+3}$ to $Fe^{+2}$ (i.e., any agent that will generate a solution redox potential low enough to reduce a substantial portion of $Fe^{3+}$ to $Fe^{2+}$). The amount of reducing agent will be that necessary to effectively reduce a substantial portion of the $Fe^{+3}$ to $Fe^{+2}$, which is typically close to the stoichiometric requirements In general, from about 70% to about 100% of the $Fe^{3+}$ is reduced to $Fe^{2+}$.

The reduction may be accomplished electrolytically or by a suitable reducing agent such as a metal or mixture of metals, including, but not limited to iron. A preferred reducing agent is elemental, scrap, or the so-called DRI (direct reduced iron) metallic iron.

Alternatively, the reduction step may be accomplished before the separation step by adding a suitable reductant to the leaching reactor.

Crystallization Ferrous chloride ($FeCl_2.4H_2O$) may be crystallized and removed from the leachate. This step will reduce the ferrous ion concentration in solution and is therefore included to provide for bulk removal of iron. The solubility of iron chloride is lowered by the presence of titanium as chloride in solution and by the presence of excess hydrochloric acid. Consequently, it is advantageous to remove the iron chloride at this stage in the process.

Crystallization of the ferrous chloride may be achieved by cooling to a temperature from about 40° C. to about 4° C. or lower, by injection of hydrogen chloride, or by a combination of the two. The lower the final temperature to which the leachate is cooled, the greater the amount of ferrous chloride that crystallizes. In practice, cooling to a temperature of about 25° C. or less is preferred.

The ferrous chloride crystals can be removed by any suitable method such as centrifugation to leave a solution containing predominantly titanium ions together with ferrous, ferric, and other impurity ions. The ferrous content in the solution is about 20 g/l or less.

The crystallized ferrous chloride can be processed further and passed on to an acid regeneration plant for recovery of its associated acid value and for the production of a valuable iron oxide byproduct. In particular, the ferrous chloride crystals are pyrohydrolyzed for HCl recovery and production of iron oxide.

Solvent Extraction I

The solution resulting from the crystallization of the ferrous chloride is subjected to liquid/liquid extraction to separate the titanium and any remaining ferric ions from the ferrous and other impurity ions and to provide a pregnant strip solution containing titanium ions and some ferric ions and a raffinate primarily containing ferrous ions and hydrochloric acid for recycle to the leaching step. The pregnant strip solution is separated from the raffinate and is directed to the second solvent extraction step in the process.

In general, the pregnant strip solution will contain titanium ions in an amount ranging from about 50 to over 100 g/l, about 2 grams per liter of $Fe^{2+}$ or less and less than 10 grams per liter of $Fe^{3+}$.

The extractant is desirably an organic phosphorus compound or a mixture of two or more organic phosphorous compounds. The organophosphorus compound may have the general formula (I)

$$R_1R_2R_3PO$$

where $R_1$, $R_2$, and $R_3$ may be the same or different and are each a hydrogen atom, a substituted or unsubstituted linear or branched chain, a cyclic, saturated, or unsaturated hydrocarbon radical, with the proviso that the sum of the carbon atoms of the radicals $R_1$, $R_2$, and $R_3$ is equal to at least 12 carbon atoms.

Where a mixture of organophosphorus compounds are used, the other organophosphorus compound(s) will have the formula (II)

$$R_4R_5R_6PO$$

where $R_4$, $R_5$, and $R_6$ may be the same or different and are each a hydrogen atom, a substituted or unsubstituted linear or branched chain, a cyclic, saturated, or unsaturated hydrocarbon radical, with the proviso that the sum of the carbon atoms of the radicals $R_4$, $R_5$, and $R_6$ is equal to at least 12 carbon atoms.

Exemplary of the radicals $R_1$, $R_2$, $R_3$, $R_4$, $R_5$, and $R_6$ include but are not limited to methyl, ethyl, n-propyl, isopropyl, butyl, isobutyl, sec-butyl, tert-butyl, n-pentyl, 1-methyl-butyl, isopentyl, tert-pentyl, neo-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, and n-octadecyl, together with the corresponding branched alkyl radicals and cycloalkyl radicals.

Exemplary substituents include hydroxy or nitro groups, halogen atoms, particularly chlorine and fluorine, lower alkoxy radicals having from one to four carbon atoms, cyano groups and the like.

A preferred extractant is a mixture of an organophosphorus extractant of formula (I) and (II), where $R_1$, $R_2$, and $R_3$ are identical linear alkyl radicals and where $R_4$, $R_5$, and $R_6$ are identical linear alkyl radicals but different from those of the $R_1$, $R_2$, and $R_3$ radicals. The proportion of the two organic phosphorus compounds of formulae (I) and (II) is determined such that a phosphine oxide mixture exists that is liquid at ambient temperature. The mixture obtained is miscible with conventional diluents in all proportions.

A particularly preferred organophosphorus extractant is a mixture of phosphine oxides tri(n-hexyl)phosphine oxide and tri(n-octyl)phosphine oxide and is commercially available from Cytec under the trade designation CYANEX 923.

The organic extractant is normally dissolved in a diluent for use in the liquid-liquid extraction step. The diluent is one that is customarily used in liquid/liquid extraction operations. Suitable diluents include aromatic hydrocarbons containing 6 to 8 carbon atoms, halogenated aromatic hydrocarbons containing 6 to 8 carbon atoms and 1 to 3 halogen atoms, saturated aliphatic hydrocarbons containing 5 to 12 carbon atoms, kerosene (refined or otherwise), and mixtures thereof. Preferably, a refined kerosene or a commercially available solvent extraction diluent such as Phillips SX-11 or Phillips SX-12 is used.

The diluent may also contain different modifying agents to improve the hydrodynamic properties of the system without adversely affecting the extracting properties of the organic phosphorus compounds. An example of such modifying agents includes alcohols having from 4 to 15 carbon atoms, phenols, and the like. Preferably, decanol is used.

The concentration of the organic phosphorus compound in the diluent is not critical and may vary over wide limits. It may range from 5% by volume of the diluent to approximately 100%, if the extractant is used in the pure state. A preferred composition contains 10% by volume organophosphorus compound, 30% by volume decanol, and 60% by volume kerosene.

Although the liquid/liquid extraction is not dependent upon a particular temperature, the temperature is generally between 10° and 70° C. and preferably between 30° and 50° C. The volume ratio of solution to organic extractant is a broad one. The chloride concentration of the feed solution is generally between 200 and 450 g/l.

The extraction may be effected using several stages including several loading stages and stripping stages. For example, three loading stages may be used with an organic to aqueous phase volumetric ratio (O/A) of about 4 and seven stripping stages may be used with an O/A of about 10.

To improve the efficiency of the separation, a washing or scrubbing stage may be added to remove entrained impurities from the pregnant strip solution.

Oxidation

Optionally, the pregnant strip solution from the first solvent extraction stage is subjected to oxidation to ensure that substantially all the iron is in the ferric form. The oxidation can be performed using any suitable means. Preferably, the oxidation is achieved by adding an effective amount of chlorine or other suitable oxidizing agent to convert all remaining ferrous iron to ferric iron.

Solvent Extraction II

The solution resulting from first liquid/liquid extraction and oxidation is subjected to a second liquid/liquid extraction to form an aqueous titanium rich raffinate and an iron-rich strip solution. The raffinate will contain less than about 10 mg/l iron, preferably less than about 5 mg/l and most preferably less than 1 mg/l iron. The iron-rich strip solution contains about 40 to about 60 g/l $Fe^{3+}$ and will be pyrohydrolyzed to recover the acid value.

In addition, the raffinate preferably contains less than about 10 mg/l (total) of other impurities that may cause undesirable coloring of the final product. Such impurities include manganese, vanadium, chromium, and nickel. More preferably, the raffinate contains less than about 5 mg/l (total) and most preferably less than about 2 mg/l (total) of these impurities.

The extractant is preferably an amine-type extractant and can include the primary, secondary, tertiary and quaternary amines. Generally, the secondary and tertiary amines are preferred. The secondary amines have the general formula $R^1R^2NH$ and the tertiary amines have the general formula $R^1R^2R^3N$ in which $R^1$, $R^2$, and $R^3$ may be the same or different and can be selected from $C_3H_7(CH_2)_5$, $CH_3(CH_2)_7$, $CH_3(CH_2)_9$, $C_2H_5(CH_2)_7$, $CH_3(CH_2)_{11}$, $CH_3(CH_2)_{12}$, or $C_9H_{19}$. $C_3$, $H_4$. Suitable example include, but are not limited to trioctylamine, dioctylamine, didecylmethylamine, octadecyldimethylamine, and mixtures thereof. Preferably, trioctylamine is used and is readily available as a commercial product from Henkel Corporation under the trade name ALAMINE 336. This product is a mixture corresponding to the formula $R^1R^2R^3N$, where $R^1$, $R^2$ and $R^3$ each represent chains with 8 to 10 carbon atoms.

The amine extractant is normally dissolved in a diluent for use in the liquid-liquid extraction step. The diluent is one that is customarily used in liquid/liquid extraction operations. Suitable diluents include aromatic hydrocarbons containing 6 to 8 carbon atoms, halogenated aromatic hydrocarbons containing 6 to 8 carbon atoms and 1 to 3 halogen atoms, saturated aliphatic hydrocarbons containing 5 to 12 carbon atoms, kerosene, and mixtures thereof. Preferably, kerosene is used.

The diluent may also contain different modifying agents to improve the hydrodynamic properties of the system without adversely affecting the extracting properties of the organic phosphorus compounds. An example of such modifying agents includes alcohols having from 4 to 15 carbon atoms, phenols, and the like. Preferably, decanol is used.

The concentration of the amine compound in the diluent is not critical and may vary over wide limits. It may range from 5% by volume of the diluent to approximately 100%, if the extractant is used in the pure state. A preferred composition contains 20% by volume amine compound, 15% by volume decanol, and 65% by volume kerosene.

Although the liquid/liquid extraction is not dependent upon a particular temperature, the temperature is generally between 10° and 60° C. and preferably between 30° and 50° C. The volume ratio of solution to organic extractant is a broad one.

The extraction may be effected using several stages including several loading stages and stripping stages. For example, three loading stages may be used with an O/A of 1-2 and seven stripping stages may be used with an O/A of about 8–10.

To improve the efficiency of the separation and to produce a very pure titanium chloride stream, a washing or scrubbing stage may be added to remove entrained impurities from the solvent extraction product.

If the amount of impurities, particularly iron, in the strip solution from the first solvent extraction step is small, there is a preferred embodiment of the invention by replacing the second solvent extraction step with an unit operation using ion exchange resins containing compounds similar as indicated previously under "Solvent Extraction II", because of the smaller size and cost of such a unit operation. A strong base ion exchange resin, such as the quaternary amine IRA-900 made by Amberlite, was found to remove iron effectively.

Vacuum Evaporation

Optionally, the raffinate generated in the second solvent extraction stage can be vacuum evaporated under conditions that inhibit formation of titanium dioxide. The water and any HCl as vapor removed from the raffinate by the evaporation process are recycled to the process.

Hydrolysis

The raffinate from the second solvent extraction operation is hydrolyzed to form the insoluble titanium dioxide. The hydrolysis may be conducted by water dilution to precipitate the titanium dioxide in the rutile form. Separation of the titanium dioxide from aqueous solution is required. Although this is effective, it has the disadvantage that the particle size and physical characteristics of the resulting titanium dioxide can not be controlled. Therefore, additional sizing may be required to obtain a desired pigment.

Preferably, hydrolysis is accomplished in a controlled temperature total evaporation process at a temperature higher than the boiling point of the solution, but lower than the temperature where significant crystal growth occurs. This temperature is generally in the range from 120° to 350° C., and preferably in the range 200° to 250° C. Hydrolysis may be accomplished by spray hydrolysis. In this regard, reference may be had to provisional patent application serial No. 60/141,057 filed Jun. 24, 1999, the entire contents of which are incorporated herein by reference. Spray hydrolysis refers to a process where the raffinate from the second solvent extraction step is evaporated until the titanium hydrolyzes and the hydrolyzed titanium is further dried. Spray hydrolysis can be effected in a spray dryer or any other piece of equipment that can provide controlled evaporation and hydrolysis conditions.

In the conditions of hydrolysis corresponding to the invention, the resulting particle size can be controlled within a fairly narrow range. For example, the resulting titanium oxide will be an almost amorphous, polymeric titanium oxide particle. Spray hydrolysis produces hollow thin-film spheres having a diameter in the range from about 1 to about 100 μm and a film thickness in the rang of about 0.2 to 1 μm, preferably in the range of about 190 nm to about 600 nm. After calcination, these spheres of amorphous material crystallize and yield elementary particles of rutile or anatase $TiO_2$, or a mixture of the two, with a narrow size distribution corresponding to high quality pigment.

Figure 5:
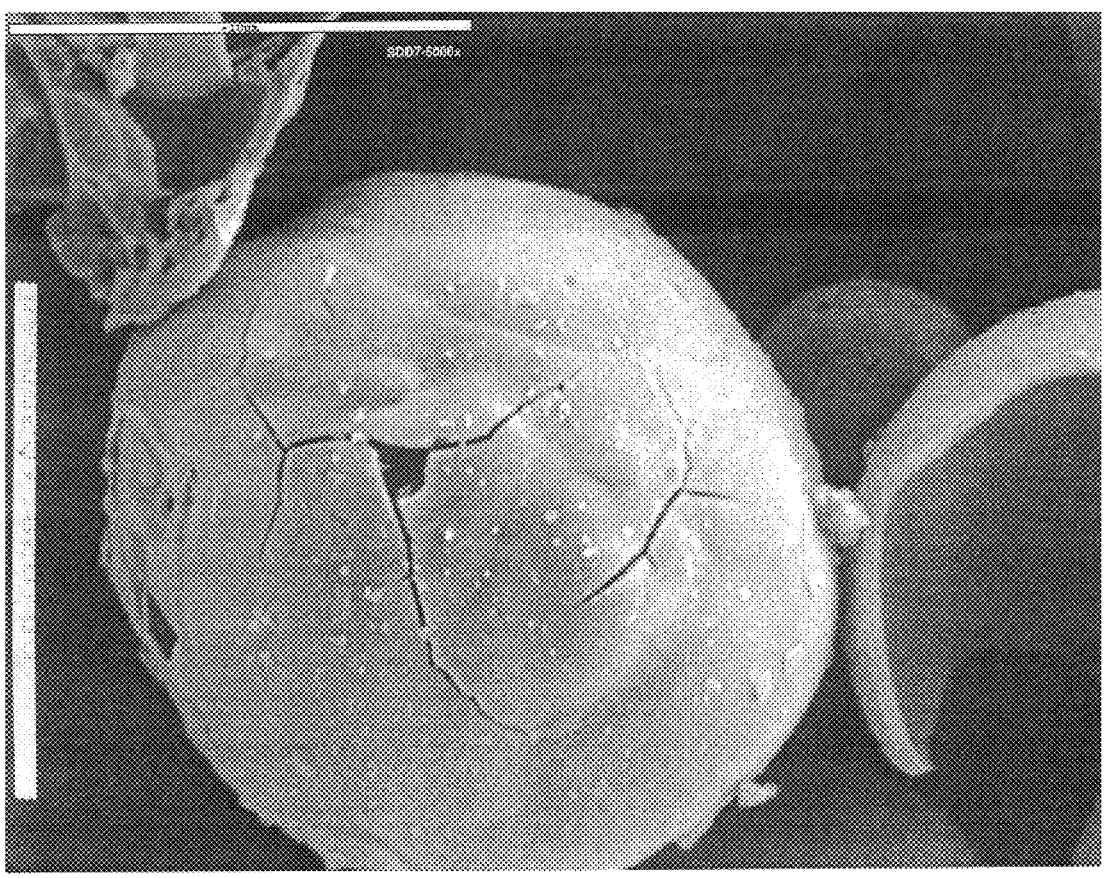
FIG. 5 is a photograph of titanium dioxide base material after hydrolysis in a spray dryer at a temperature of 200° C. The material was produced according to the present invention and is magnified 5000 fold.

FIG. 5 shows a photograph of titanium dioxide base material after spray hydrolysis at a temperature of about 200° C. This photograph shows the amorphous nature of the material.

Without being bound by any theory, it is believed that spray hydrolysis at a relatively low temperature yields a substantially amorphous solid that can readily be converted to rutile or anatase. Spray hydrolysis also has the advantage of direct processing of the raffinate so that the formation of titanium dioxide and drying are simultaneously accomplished.

Optionally, minor amounts of chemical control agents to control the physical characteristics of the to-be-formed titanium dioxide may be introduced into the raffinate generated in the second solvent extraction stage prior to or after vacuum evaporation or, if there is no vacuum evaporation, before spray hydrolysis. The chemical control agents include but are not limited to chloride, carbonate and phosphate salts of lithium, sodium, potassium, aluminum, tin, and zinc, or phosphoric acid. It is believed that these chemical control agents promote rutile or anatase crystal growth as desired as well as control the average particle size distribution.

Where spray hydrolysis is used, calcination and milling are required.

Calcination and Milling

As noted above, the titanium oxide product resulting from spray hydrolysis is calcined to convert the almost amorphous oxide to titanium dioxide having the desired crystal structure. The product is calcined at a temperature sufficient to produce titanium dioxide pigment but at a temperature less than that for particle sintering to occur. The calcination is conducted at a temperature between about 500° C. to about 1,100° C. Preferably, the calcination temperature is from about 800° C. to about 1,000° C., more preferably about 900° C.

During calcination, any residual chloride will be expelled as HCl gas, which can then be recovered.

Optionally, minor amounts of chemical control agents to control the physical characteristics of the to-be-formed titanium dioxide may be introduced after spray drying and before calcination. The chemical control agents include but are not limited to chloride, carbonate and phosphate salts of lithium, sodium, potassium, aluminum, tin, and zinc, or phosphoric acid. It is believed that these chemical control agents promote rutile or anatase crystal growth as desired as well as control the average particle size distribution.

Figure 4:
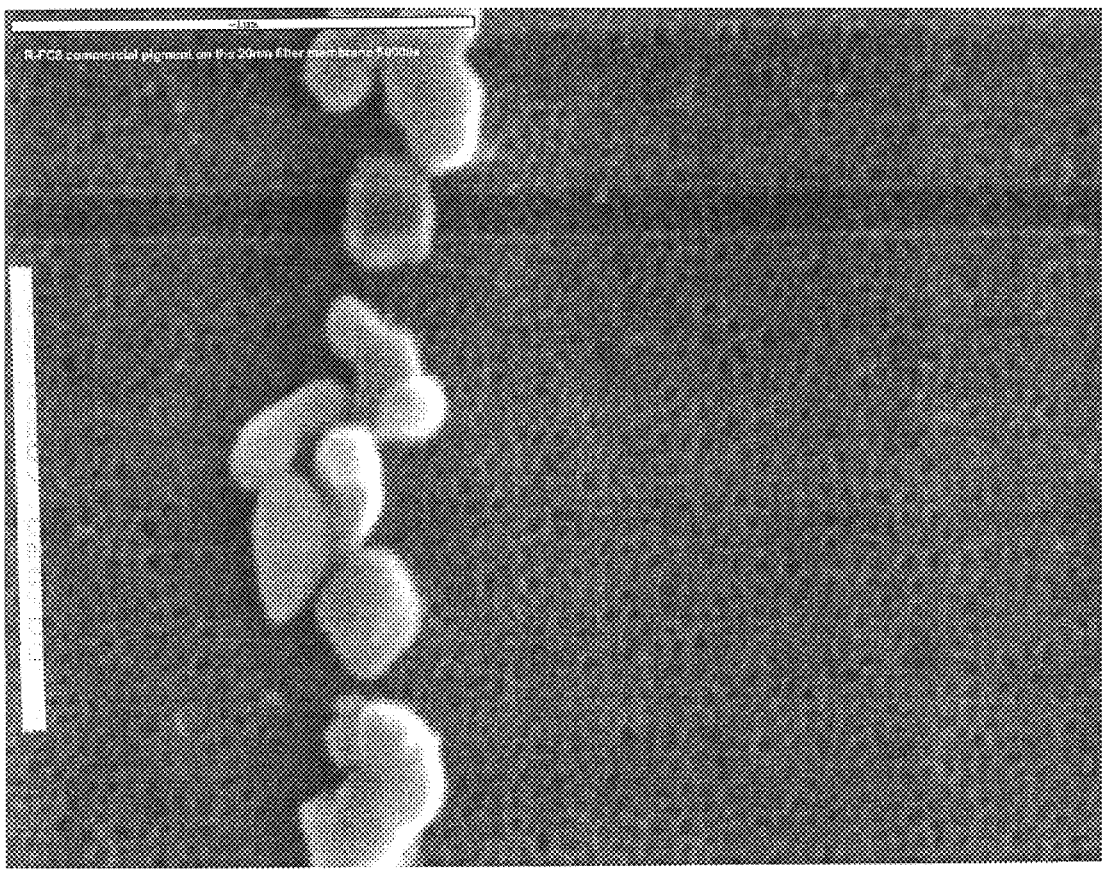
FIG. 4 is a photograph of commercial titanium dioxide (rutile) white pigment magnified 50,000 fold.
Figure 6:
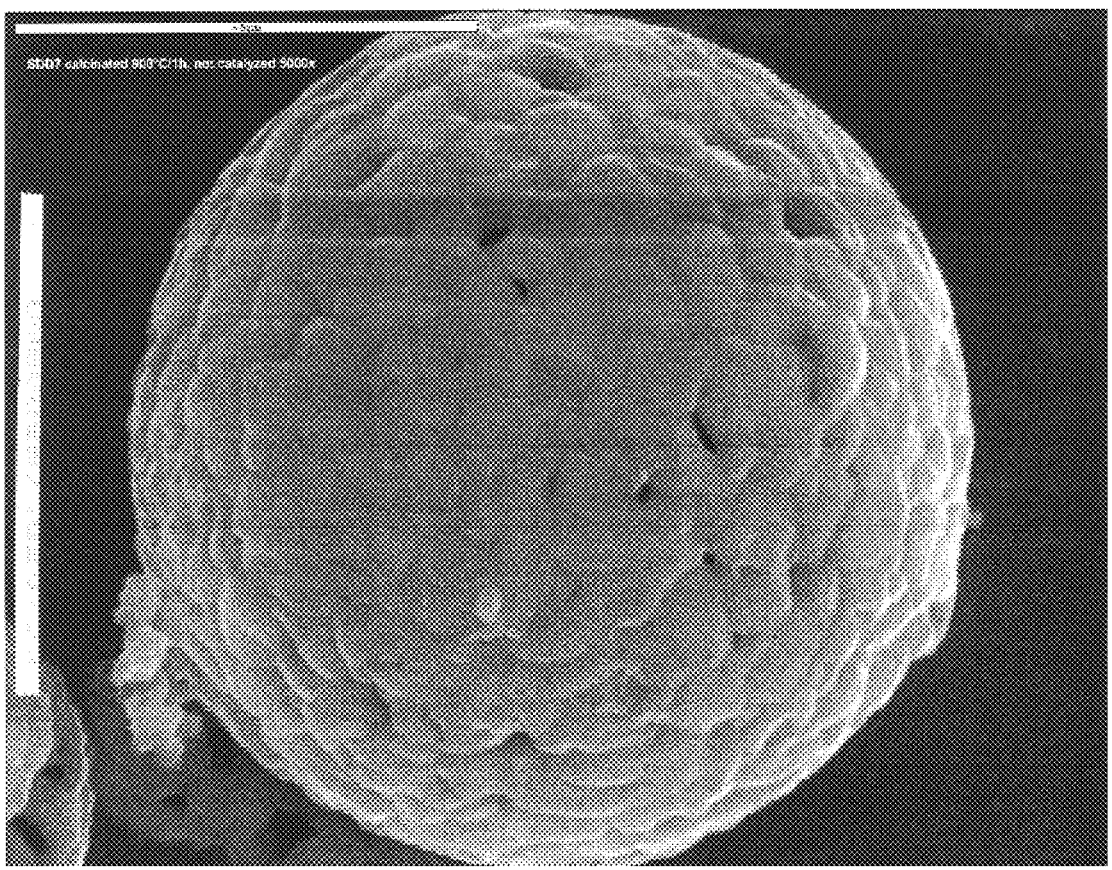
FIG. 6 is a photograph of a titanium dioxide base material after calcination at 900° C. for one hour and with no chemical control agents present. The base material was produced according to the present invention wherein the hydrolysis was accomplished in a spray dryer. The shown particle was magnified 5,000 fold.

FIG. 6 shows a photograph of a spray-hydrolyzed titanium dioxide base material (e.g., a base material of FIG. 4) that has been calcined at 900° C. for one hour. The photograph shows that the amorphous surface of the spray dried titanium dioxide material particle has been converted into a crystal-type structure. This particle can then be milled to break the crystal-type structure into the resulting primary titanium dioxide pigment particles.

Figure 7:
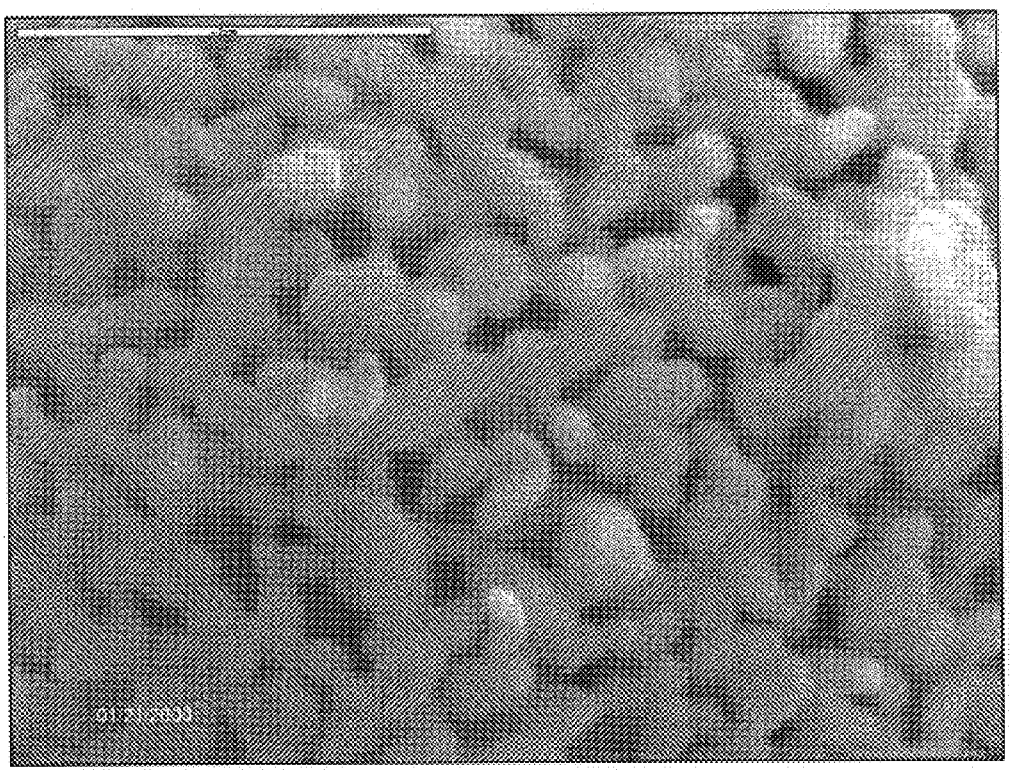
FIG. 7 is a photograph of a titanium dioxide base material after calcination at 920° C. for 90 min and with an amount of Sn equivalent to 1% of the amount of TiO2, added to the solution as $SnCl_2.2H_2O$. The base material is rutile and was produced according to the present invention wherein the hydrolysis was accomplished in a spray dryer. The shown particle was magnified 25,000 fold.

FIG. 7 shows a photograph of a titanium dioxide particle after calcination at 920° C. for 90 min. An amount of Sn equivalent to 1% of the amount of $TiO_2$ was added to the solution as $SnCl_2 \cdot 2H_2O$ before hydrolysis.

Figure 8:
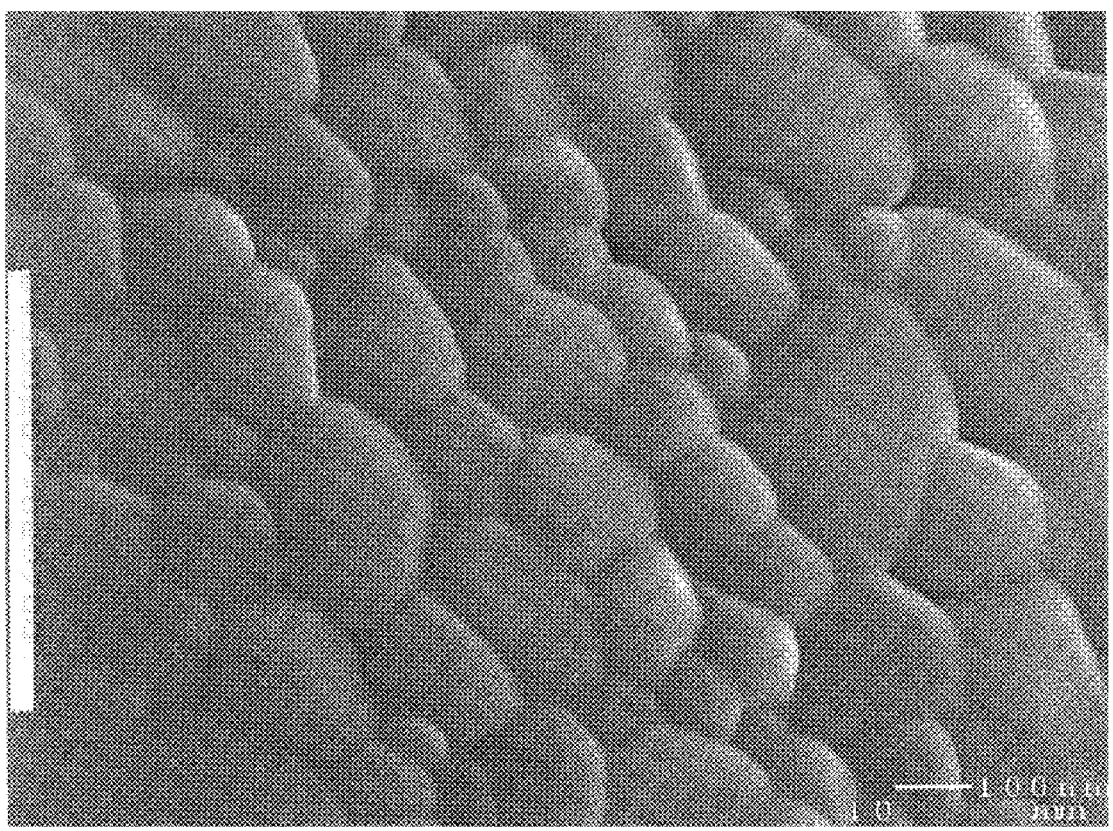
FIG. 8 is a photograph of a titanium dioxide base material after calcination at 920° C. for 2 hours and with an amount of phosphoric acid equivalent to 2% of the amount of $TiO_2$, added to the solution. The base material is anatase. It was produced according to the present invention wherein the hydrolysis was accomplished in a spray dryer. The shown particle was magnified 200,000 fold.

FIG. 8 is a photograph of a titanium dioxide particle after calcination at 920° C. for 2 h. An amount of phosphoric acid equivalent to 2% of the amount of $TiO_2$ was added to the solution before hydrolysis. The shown particle was magnified 25,000 fold.

Finishing

After hydrolysis, the pigment contains either anatase or rutile, depending on the hydrolysis method. In any event, the pigment is generally finished to produce a white product suitable for commercial sale.

Figure 3:
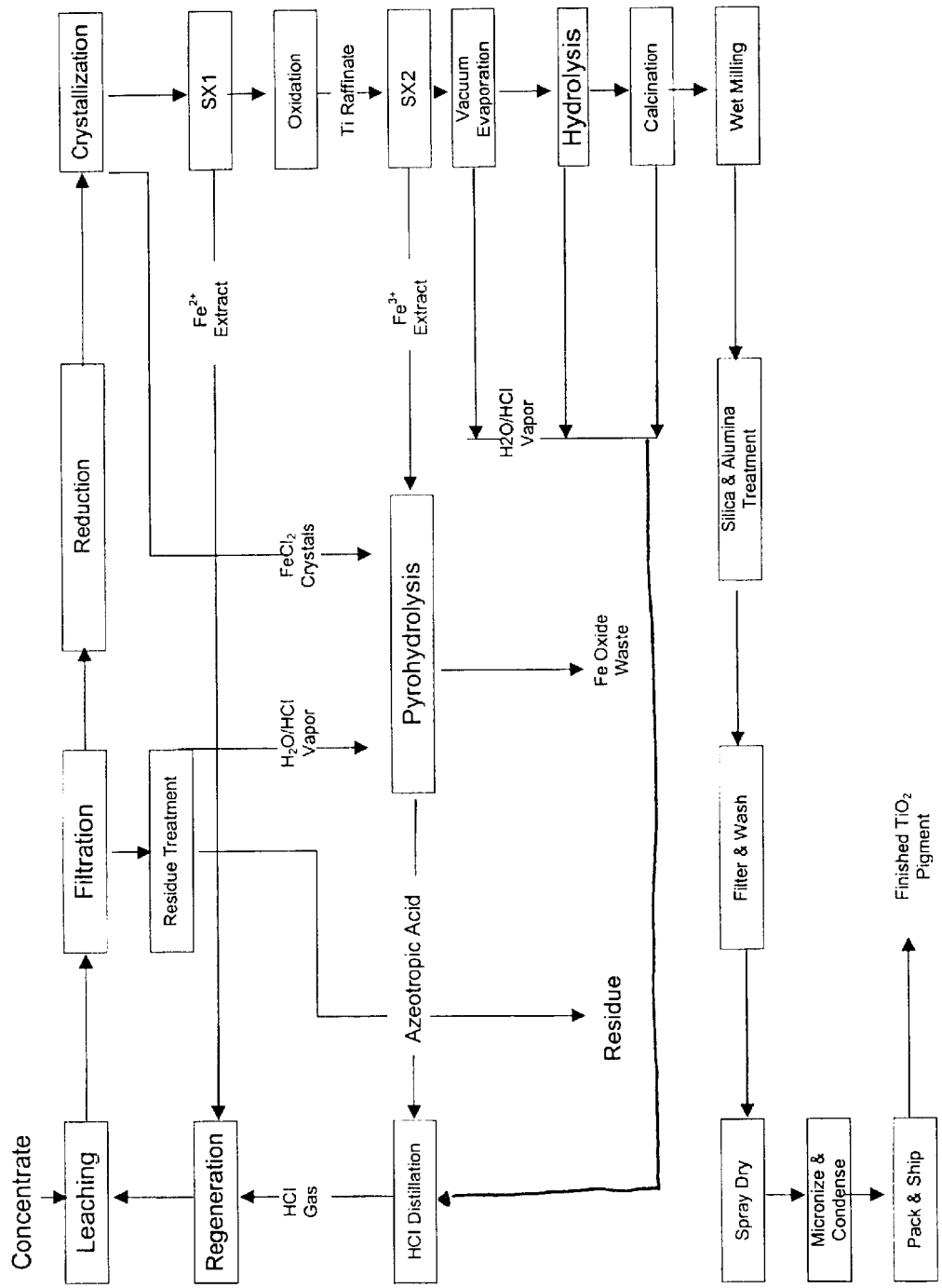
FIG. 3 is a flow sheet of a preferred embodiment of the process according to the present invention, including optional vacuum evaporation and finishing to produce pigment quality $TiO_2$.

As shown in FIG. 3, the finishing can include wet milling, silica and alumina treatment, filtering and washing, spray drying, micronizing and condensing, and packing and shipping. The silica and alumina treatment generally includes precipitating alumina, silica, zirconia, or other metal oxides, on the surface of the titanium dioxide. The purpose of this treatment is to impart photo stability, shelf life, dispersability, and flowability.

Acid Regeneration

In the preferred embodiment of the process according to the present invention, it is desired to recover the acid value from the processing steps and to regenerate the hydrochloric acid. In the present process, hydrochloric acid is used to dissolve the ilmenite. Sufficient acid is used to convert the titanium, iron, and other soluble elements to their respective chloride salts and to leave an excess of free acid.

The hydrolysis operation effectively releases the acid values associated with the titanium chloride while precipitating the titanium hydrate. To provide for an economical process, it is desired that essentially all of the acid originally used to digest the ilmenite be recovered and returned at the appropriate strength for reuse.

To accomplish this objective the ferrous chloride crystals from the crystallization step and the ferric chloride from the solvent extraction step are combined and subjected to pyrohydrolysis. The pyrohydrolysis can be accomplished by any known and suitable manner such as spray roasting or fluidized bed roasting. The hydrogen chloride gas leaving the pyrohydrolysis reactor can be absorbed in water to provide hydrochloric acid having a strength in the range from about 15% to about 20% by weight. This hydrochloric acid as well as $H_2O/HCl$ vapor from the leach residue processing, the vacuum evaporation, hydrolysis, and calcination steps may thereafter be distilled to form two streams, one of hydrogen chloride gas, and the other of a weak acid solution. The hydrogen chloride gas returns to the leaching section where it may be combined with the raffinate from the first solvent extraction step, consisting of a hydrochloric acid solution of intermediate strength with up to 40 g/l iron as chloride, to re-form the full strength leaching solution. As a result, the desired concentration of hydrochloric acid in the solution used for leaching can be maintained.

The weak acid solution from the distillation step is preferably used to form the barren stripping solutions in the solvent extraction steps of the process.

Bleed stream

To limit the accumulation of impurities in the leaching solution, it is desirable to bleed some of the solution out of the circuit before it is sent back to regeneration and leaching. The amount (volume) of the bleed stream will depend on the amount and the nature of the impurities in the feed material. Generally, it will be about 5–10% of the amount of leaching solution. The bleed solution can be treated by pyrohydrolysis to separate iron, titanium and most impurities as oxides, sending back a stream of hydrochloric acid solution into the regeneration circuit. Other separation methods such as solvent extraction or ion exchange are also possible to remove impurities from the bleed stream.

The following examples illustrate, but do not limit, the present invention. Unless otherwise indicated, all parts and percentages are by weight.

EXAMPLE I

A volume of 4.2 m³ of raffinate from solvent extraction step I is transferred to a 6- m³ glass lined stirred tank. HCl gas from the HCl regeneration plant is injected at a rate of 200 kg/h for about 3.5 h. The total chloride concentration after injection is 403 g/l. Water from a cooling tower is circulated through jackets to keep the temperature between 40°–45° C. during the process. The final volume is 4.5 m³ (See Table 2).

The regenerated acid is transferred to the leaching reactor, where 620 kg of ilmenite ore, with a particle size less than 300 μm, originating from the Beenup deposit in Western Australia, is added in about 20 min by means of a mechanical conveying system. The reactor is then closed and heated to 80° C. Dissolution of the ilmenite brings the Ti concentration to 43.9 g/l, the ferric iron to 10.5 g/l, and the ferrous iron to 50.6 g/l after 5.5 h at the operating temperature of 80° C. The suspension is subsequently pumped through a filter press where the leach residue is separated. A mass balance shows that 89% of the Ti and 93% of the Fe goes into solution.

The filtered solution is collected in the reduction/crystallization reactor, where 54 kg of commercial grade iron powder is added, converting more than 95% of the ferric iron to ferrous in about 15 min. The reactor is subsequently cooled to 20° C. by passing cold water through the jackets. Ferrous chloride crystals form and the total iron concentration decreases to 23 g/l Fe. A typical analysis of the iron chloride crystals is 28.5% Fe and 0.2% Ti. This corresponds approximately to the formula $FeCl_2 \cdot 4H_2O$. The resulting suspension is filtered, yielding a feed solution for solvent extraction. Table 2 gives further details on the quantities and concentrations involved and shows typical parameters and results of a regeneration, leaching, and crystallization cycle.

TABLE 2

|  | Weight (kg) | Volume ($m^3$) | Concentrations (g/l for solutions, % weight for solids) | | | |
|---|---|---|---|---|---|---|
|  |  |  | $Fe^{3+}$ | $Fe^{2+}$ | Ti | Cl |
| Regeneration Input |  |  |  |  |  |  |
| SX1 raffinate to be regenerated |  | 4.2 | 2 | 22 | 0.5 | 280 |
| HCl gas injected (99% HCl) | 682 |  |  |  |  |  |
| Leaching Input = product of regeneration |  |  |  |  |  |  |
| Regenerated hydrochloric acid solution |  | 4.5 | 1.8 | 20.2 | 0.5 | 403 |
| Ilmenite | 620 |  | 7 | 25.7 | 31.3 | 0 |
| Products |  |  |  |  |  |  |
| Leachate |  | 4.6 | 10.5 | 50.6 | 43.9 | 403 |
| Residue | 74.6 |  | 0 | 20.8 | 34.1 | 2.6 |
| Reduction |  |  |  |  |  |  |
| Fe powder | 54 |  |  |  |  |  |
| Solution after reduction |  | 4.6 | 0 | 70.1 | 43.9 |  |
| Crystallization |  |  |  |  |  |  |
| Solution after crystallization |  |  | 0 | 23 | 43.9 |  |

EXAMPLE II

This provides an example of the first solvent extraction step according to the present invention. A solution containing 31.6 g/l Ti, 27.3 g/l $Fe^{2+}$, and 0.2 g/l $Fe^{3+}$ is fed to a series of 3 extraction stages and 6 stripping stages. The organic phase is 10% Cyanex 923, 30% decanol, and 60% kerosene. The strip feed is a 1-M solution of HCl. The temperature is kept at 45° C. The organic/aqueous feed flow rate ratio is 4 and the organic/aqueous strip solution flow ratio is 10. The products are a pregnant strip solution at 67.8 g/l Ti, 0.8 g/l $Fe^{2+}$ and 2.2 g/l $Fe^{3+}$. The raffinate contains 28.7 g/l $Fe^{2+}$, no detectable $Fe^{3+}$, and 0.11 g/l Ti. Table 3 provides typical conditions of the first extraction step.

TABLE 3

|  | A/O* ratio | Concentrations (g/l) | | | |
|---|---|---|---|---|---|
|  |  | Ti | $Fe^{2+}$ | $Fe^{3+}$ | Cl |
| Feed solution | 0.25 | 31.6 | 27.3 | 0.2 | 349 |
| Strip feed | 0.1 | 0 | 0 | 0 | 36 |

TABLE 3-continued

|  | A/O* ratio | Concentrations (g/l) | | | |
|---|---|---|---|---|---|
|  |  | Ti | $Fe^{2+}$ | $Fe^{3+}$ | Cl |
| Raffinate | 0.25 | 0.11 | 28.7 | 0 | 264 |
| Extract | 0.1 | 67.8 | 0.8 | 2.2 | 235 |

*A/O = volume flow rate of aqueous phase/volume flow rate of organic phase

EXAMPLE III

This provides an example of the second solvent extraction step according to the present invention. A solution containing 58.7 g/l Ti, 6.9 g/l $Fe^{+3}$, and less than 0.01 g/l $Fe^{+2}$ is fed to a solvent extraction system of 4 extraction stages and 7 stripping stages, with an organic/aqueous feed volumetric flow rate ratio of 1.33 and an organic/aqueous strip flow ratio of 10. The organic phase consists of a mixture of 20% Alamine 336, 15% decanol, and 65% kerosene. The strip feed is a 0.01 M HCl aqueous solution. The products are a raffinate with less than 0.01 g/l total Fe, and a pregnant strip solution with 58.5 g/l $Fe^+$ and 0.12 g/l Ti. Results are shown in Table 4.

TABLE 4

|  | A/O* ratio | Concentrations (g/l) | | | |
|---|---|---|---|---|---|
|  |  | Ti | $Fe^{2+}$ | $Fe^{3+}$ | Cl |
| Feed solution | 0.75 | 58.7 | <0.01 | 6.9 | 239 |
| Strip feed | 0.1 | 0 | 0 | 0 | 0.35 |
| Raffinate | 0.75 | 59.5 | <0.01 | 0 | 227 |
| Extract | 0.1 | 0.12 | 0 | 58.5 | 125 |

*A/O = volume flow rate of aqueous phase/volume flow rate of organic phase

EXAMPLE IV

This provides an example of the pyrohydrolysis step. Ferrous chloride crystals from Example I are redissolved in the pregnant strip solution of Example III. The resulting solution contains 80 g/l $Fe^{+2}$, 20g/l $Fe^{+3}$, 0.3 g/l Ti, and 220 g/l total chloride. This solution is fed to a pyrohydrolyzer and a gas absorption tower. The products are $Fe_2O_3$ powder with less than 1% Cl, and an HCl solution at 18% HCl and 3 g/l Fe.

EXAMPLE V

Twenty-eight liters of solution containing 383 g/l HCl are transferred to a jacketed, stirred, glass-lined steel reactor with a capacity of 40 l. A weight of 4.2 kg of ilmenite from the Beenup deposit (31.3% Ti, 32.8% Fe) is added to the reactor. The temperature is raised from room temperature to 80° C. in 45 min by means of a closed circuit of hot water pumped through the jacket. After 3h, a sample of solution is taken from the reactor. The Ti concentration in this sample is 34.2 g/l, and corresponds to the dissolution of 72.8% of the titanium from the feed material.

EXAMPLE VI

A volume of 27.2 liters of the same solution as used in Example 5 is transferred to the same reactor. The reactor is closed and gaseous HCl is injected at a rate of 1.2 kg/h during 1 h 40 min. Cooling water is passed through the jackets. The volume after injection is calculated to be 28l. The HCl concentration after injection is 452 g/l.

A weight of 4.2 kg of ilmenite from the Beenup deposit (31.3% Ti, 32.8% Fe) is added to the reactor. The temperature is raised to 80° C. in the same manner as in Example 5. A sample of solution taken after 3 h shows a concentration of 44.2 g/l Ti, and corresponds to the dissolution of 94.1 % of the titanium from the feed.

Examples V and VI clearly demonstrate the significant advantage of using the present invention to obtain a beneficial use of gaseous hydrochloric acid: under similar conditions the titanium dissolution could be increased from 72.8% to 94.1% by using gaseous hydrochloric acid.

EXAMPLE VII

This provides an example of the titanium hydrolysis step according to the present invention. A raffinate from the second solvent extraction step contains 53 g/l Ti and 210 g/l Cl. The equivalent of 1% Sn in $TiO_2$ is added as $SnCl_2.2H_2O$. The solution is fed to a commercial spray dryer, bag filters and two absorption columns for HCl absorption. The solution is injected at a rate of 2.25 liters/min. Gases from the combustion of natural gas, diluted with air to 550° C. are injected into the chamber. The outlet temperature of the chamber is maintained at 250° C, and the total gas flow rate 800 scfm.

The product recovered on the bag filter consists of spherical particles or parts of spherical particles. After calcination in a muffle furnace at 920° C. for 90 min, the spheres or parts of spheres form a sub-structure of crystalline rutile particles. FIG. 7 is a scanning electron micrograph of this product and shows that the elemental particle size is of the order of 250 nanometer. After milling to break up the structure into the individual crystalline particles, a product with a median particle size of 250 nanometer is obtained.

While there have been described what are presently believed to be the preferred embodiments of the invention, those skilled in the art will realize that changes and modifications may be made thereto without departing from the spirit of the invention. It is intended to claim all such changes and modifications that fall within the true scope of the invention.

What is claimed is:

1. A hydrometallurgical process for producing pigment-grade titanium dioxide from a titaniferous ore comprising:
   a. leaching the ore with a solution of hydrochloric acid at a temperature of at least 50° C. to provide a leachate containing titanium chloride, ferrous chloride, ferric chloride, and other impurity chlorides, a residue comprising undissolved solids, and an amount of hydrochloric acid to prevent precipitation of titanium dioxide;
   b. separating the leachate from the undissolved solids;
   c. reducing ferric ions present in the leachate to the ferrous state;
   d. cooling the leachate to a temperature sufficient to form crystals of ferrous chloride;
   e. separating the crystals of ferrous chloride from the leachate to provide a solution containing titanium ions, ferric ions, and ferrous ions;
   f. contacting the solution with a water-immiscible organic phase containing an organophosphorus extractant to form a first raffinate containing ferrous ions and other impurities and to form a first pregnant strip solution containing titanium and ferric ions and a minor amount of ferrous ions;
   g. contacting the first pregnant strip solution with a water-immiscible organic phase containing an amine extractant to form a second pregnant strip solution containing ferric ions and to form a second raffinate containing titanium ions; and
   h. hydrolyzing the second raffinate.

2. The process of claim 1 wherein the second raffinate contains less than about 10 mg/l iron.

3. The process of claim 1 wherein the reduction step includes the addition of elemental iron.

4. The process of claim 1 wherein the reduction step c takes place before the residue separation step b.

5. The process of claim 1 wherein the separated ferrous chloride crystals are subjected to pyrohydrolysis to regenerate HCl.

6. The process of claim 1 wherein the first raffinate is enriched in chloride ions by using gaseous hydrochloric acid from an acid regeneration plant.

7. The process of claim 1 wherein the first pregnant strip solution is subjected to an oxidation step before contacting with the water-immiscible amine extractant.

8. The process of claim 7 wherein the oxidation is achieved by adding an effective amount of chlorine or other suitable oxidizing agent to convert all remaining ferrous iron to ferric iron.

9. The process of claim 1 wherein the second pregnant strip solution is subjected to pyrohydrolysis to regenerate HCl.

10. The process of claim 1 wherein the hydrolysis is conducted by adding water to form titanium dioxide pigment.

11. The process of claim 10 wherein the titanium dioxide pigment is in the rutile form.

12. The process of claim 10 wherein the titanium dioxide pigment is in the anatase form.

13. The process of claim 10 wherein the titanium dioxide pigment is a mixture of $TiO_2$ in the rutile and the anatase form.

14. The process of claim 1 wherein the titanium hydrolysis is conducted by spray hydrolysis of the second raffinate.

15. The process of claim 14 further including the step of calcining and milling after spray hydrolysis to form titanium dioxide.

16. The process of claim 15 wherein the titanium dioxide is in the rutile form.

17. The process of claim 15 wherein the titanium dioxide is in the anatase form.

18. The process of claim 15 wherein the titanium dioxide is a mixture of $TiO_2$ in the rutile and the anatase form.

19. The process of claim 1 wherein the organophosphorus extractant is selected from one or more organophosphorus compounds having the formula $R_1R_2R_3PO$ wherein $R_1$, $R_2$, and $R_3$ may be the same or different and are each a hydrogen atom, a substituted or unsubstituted linear or branched chain, a cyclic, saturated, or unsaturated hydrocarbon radical, with the proviso that the sum of the carbon atoms of the radicals $R_1$, $R_2$, and $R_3$ is equal to at least 12 carbon atoms.

20. The process of claim 19 wherein the organophosphorus extractant is a mixture of tri(n-hexyl) phosphine oxide and tri(n-octyl phosphine oxide).

21. The process of claim 1 wherein the amine extractant is selected from the group consisting of primary, secondary, tertiary, quaternary amines, and mixtures thereof.

22. The process of claim 21 wherein the amine extractant is a tertiary amine.

23. The process of claim 1 wherein the titaniferous ore is ilmenite.

24. The process of claim 1 wherein the solution of hydrochloric acid contains a concentration of hydrochloric acid of at least 250 g/l.

25. The process of claim 24 the ore is present in an amount and the concentration of hydrochloric acid are such that the leachate contains greater than 250 g/l hydrochloric acid.

26. The process of claim 1 wherein the solution of hydrochloric acid contains a concentration of hydrochloric acid of at least 360 g/l and wherein the temperature is at least 70° C.

27. The process of claim 26 wherein the temperature is less than 120° C.

28. The process of claim 26 wherein the ore is present in an amount and the concentration of hydrochloric acid are such that the leachate contains greater than 250 g/l hydrochloric acid.

29. The process of claim 1 wherein the temperature is less than 120° C.

30. The process of claim 1 wherein the ore is present in an amount and the concentration of hydrochloric acid are such that the leachate contains greater than 250 g/l hydrochloric acid.

31. A hydrometallurgical process for producing pigment-grade titanium dioxide from a titaniferous ore comprising:

a. leaching the ore with hydrochloric acid to provide a leachate containing titanium chloride, ferrous chloride, ferric chloride, and other impurity chlorides and a residue comprising undissolved solids;

b. separating the leachate from the undissolved solids;

c. forming ferrous chloride in the leachate and separating the ferrous chloride from the leachate to provide a solution containing titanium ions, ferric ions, and ferrous ions;

d. contacting the solution with a water-immiscible organic phase containing an organophosphorus extractant to form a first raffinate containing ferrous ions and other impurities and to form a first pregnant strip solution containing titanium and ferric ions and a minor amount of ferrous ions;

e. contacting the first pregnant strip solution with an ion exchange resin to form a second raffinate containing titanium ions; and f. hydrolyzing the second raffinate.

* * * * *